United States Patent
Wysong

[15] 3,667,311
[45] June 6, 1972

[54] RECIRCULATING BALL SCREW
[72] Inventor: Paul V. Wysong, Northridge, Calif.
[73] Assignee: Schrillo Company, Sepulveda, Calif.
[22] Filed: Dec. 9, 1970
[21] Appl. No.: 96,340

[52] U.S. Cl. ................................74/424.8 R, 74/467
[51] Int. Cl. ................F16h 1/18, F16h 55/22, F16h 57/04
[58] Field of Search...........................74/459, 424.8 R, 467

[56] References Cited

UNITED STATES PATENTS

| | | | |
|---|---|---|---|
| 2,895,343 | 7/1959 | Orner | 74/459 |
| 2,714,821 | 8/1955 | Orner | 74/459 |
| 2,851,897 | 9/1958 | Cochrane | 74/459 |
| 3,592,072 | 7/1971 | Nilsson | 74/459 |

FOREIGN PATENTS OR APPLICATIONS 880,001  10/1961   Great Britain..........................74/459

Primary Examiner—Leonard H. Gerin
Attorney—Spensley, Horn & Lubitz

[57] ABSTRACT

A recirculating ball screw suitable for high speed operation and having an improved lubrication system is disclosed. Recirculation of the balls is accomplished in a smooth and continuous manner by a new ball recirculating member which cooperates with the lead screw to urge the balls out of their normal ball track to transfer the ball over the lead screw in an axial direction and then deposit the ball smoothly back into the ball track without the use of ball pick-up fingers protruding into the ball track. The improved lubrication system is comprised of an outer sleeve which seals the lubricant in place by the use of sealing rings so as to prevent lubricant contamination and unwanted lubricant migration.

7 Claims, 9 Drawing Figures

PATENTED JUN 6 1972 3,667,311
SHEET 1 OF 2
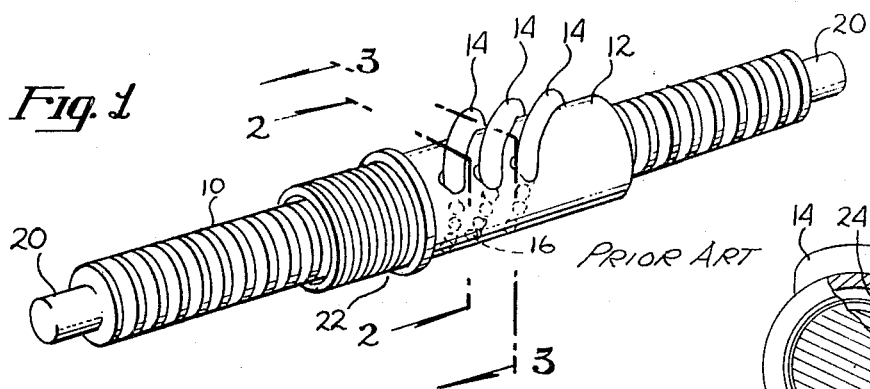
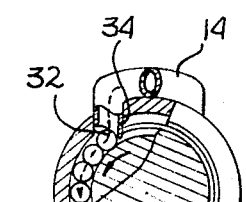
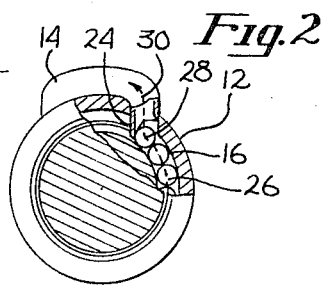
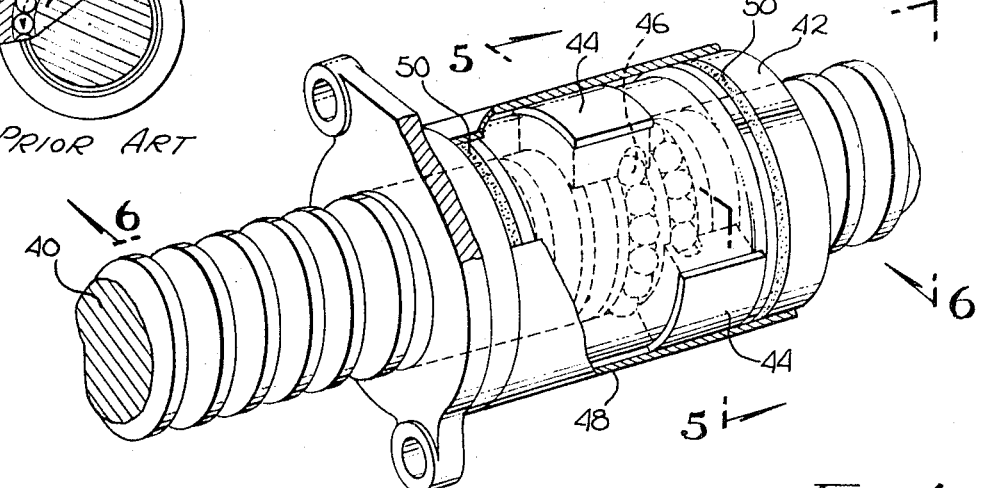
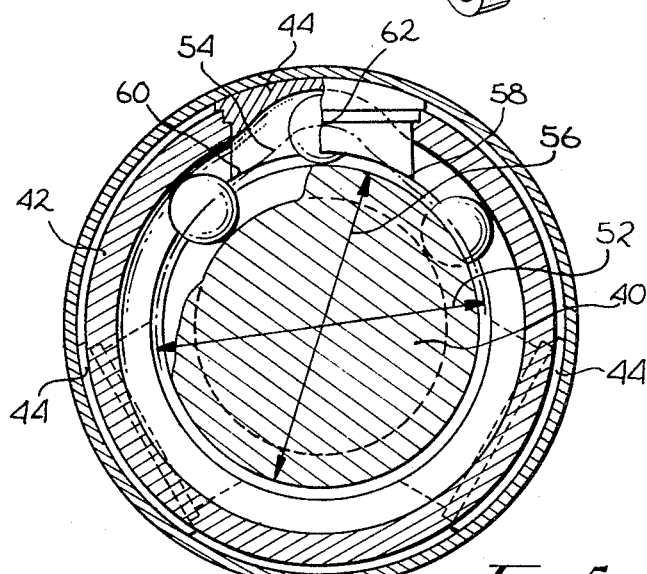
PAUL V. WYSONG
INVENTOR.
BY Spensley, Horn & Lubitz
ATTORNEYS

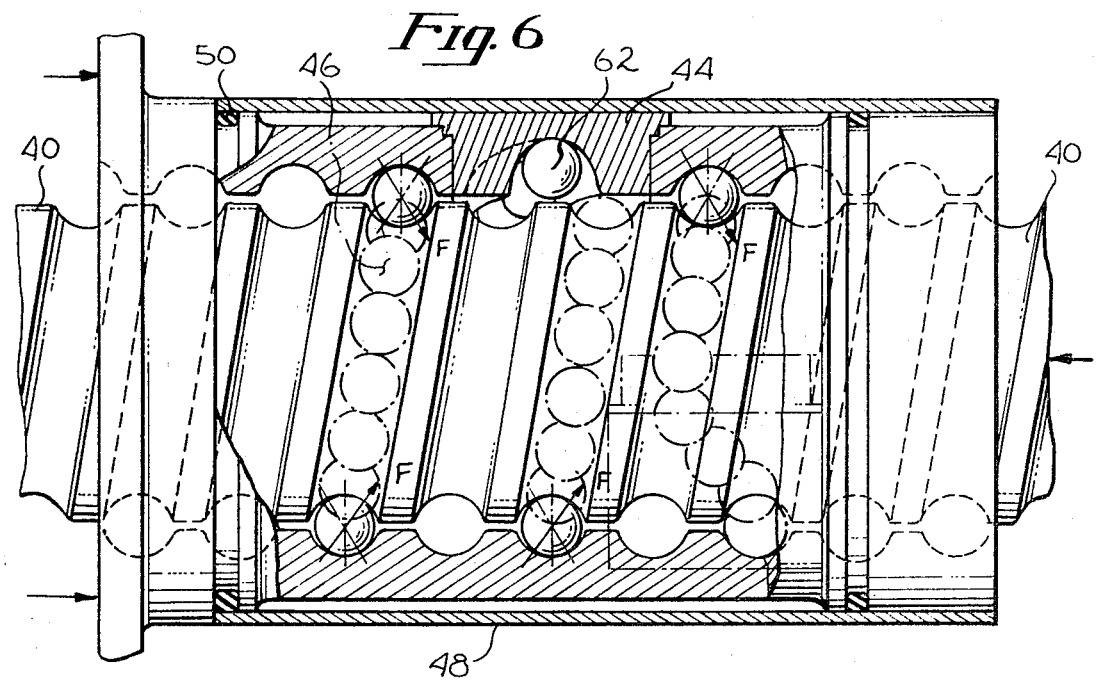
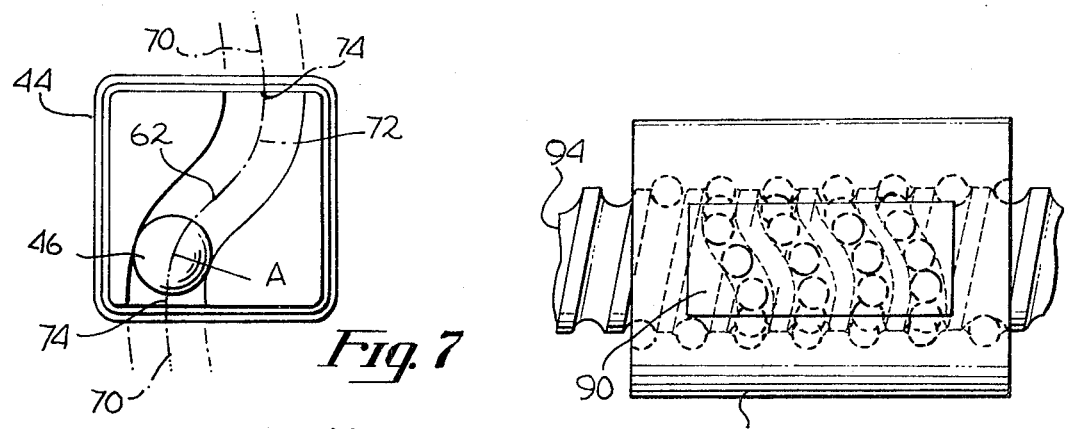
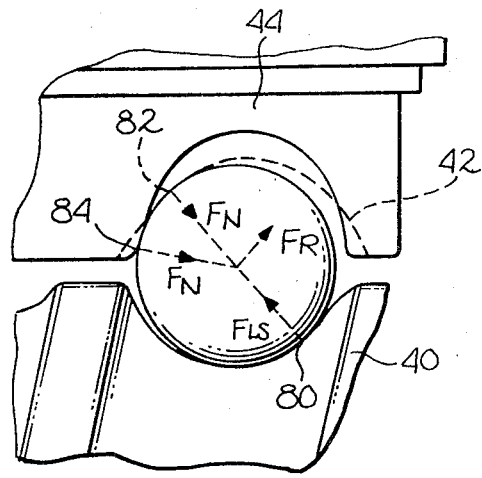

RECIRCULATING BALL SCREW

BACKGROUND OF THE INVENTION

1. Field of the Invention

This invention relates to the field of recirculating ball screws.

2. Prior Art

Recirculating ball screws are well known in the prior art for the conversion of an angular rotation to linear translation and conversely linear translation to angular rotation. A typical application is in the flap actuating mechanism used in many modern jet aircraft. In such an application, the lead screw may be supported on bearings and is driven by a reversible motor. The nut of the recirculating ball screw is attached to the flap, as are other linkages which support the flap throughout its travel. By running the motor in one direction, the nut advances on the lead screw, thereby forcing the flap towards its extended position. Reversing the motor will reverse the direction of travel of the nut with respect to the lead screw, thereby urging the flap toward its retracted position.

Recirculating ball screws are capable of creating very high forces with a minimum of friction and wear and, therefore, are usually driven by a motor through a reduction gear, so as to take full advantage of the force creating ability of the ball screw. Because of the reduction gear, the angular velocity of the driving member of the ball screw, usually the lead screw, is relatively low and, consequently, prior art recirculating ball screws which had a relatively low maximum operating angular velocity were still useful in such applications. However, operation of the prior art recirculating ball screws at higher angular velocities would result in a sudden and premature failure of the ball recirculating mechanism, for the reasons hereinafter described.

Recirculating ball screws are comprised of a lead screw, a nut, a plurality of balls and one or more ball recirculating members. The lead screw has a helical ball track or groove with a cross-section very much like the cross-section of the inner race of an annular contact ball bearing. Similarly, the nut contains a helical ball groove or track with the same lead as the lead screw, and again, with a cross-section much like the cross-section of an outer race of an annular contact ball bearing. The ball recirculating member or members pick the balls out of their normal track, defined by the lead screw and nut, transports them axially, and deposits them at a new location along the lead screw, so as to retain and recirculate the balls in their desired trajectory.

Prior art recirculating ball screws had either internal ball recirculation, that is, ball recirculation within the lead screw, or external ball circulation, that is, ball circulation on or within the nut. In either case, ball recirculation is accomplished with the use of a finger which extends into the helical ball path so as to intercept the balls, one at a time, and lift them out of the load path into the ball recirculation channel, which directs the balls in a generally axial direction and redeposits the balls at a second axial location for recycling through the helical ball path between the nut and lead screw. The balls approaching the pick-up finger follow a generally helical path defined by the rolling of the balls in the helical ball tracks of the lead screw and nut, and on striking the pick-up finger, are redirected so as to have a substantial impact force to direct the balls out of this helical ball path and to recycle them to a new position on the ball screw. Because of the abrupt change in direction of the ball caused by the pick-up finger, the ball pick-up finger must have sufficient strength and toughness to resist "Brinelling" and/or fatigue. For low speed operation, the forces with which the ball strikes the ball pick-up finger are quite low and a ball pick-up finger of sufficient toughness may readily be made to achieve a reasonable life and reliability. However, if the speed of operation of the ball screw is increased, both the force with which the ball strikes the ball pick-up finger and the frequency of such striking increases, so that even at moderate speeds, the increased frequency of impingement causes premature fatigue failure of the pick-up finger resulting in total failure of the recirculating ball screw.

The forces with which the ball strikes the ball pick-up finger in the prior art recirculating ball screws can be reduced by reducing the abrupt angular change in the ball path from the helical path in the ball screw to the path defined by the ball pick-up finger, that is, by making the ball pick-up finger more nearly tangent to the helical ball path. However, to do this, a longer and thinner ball pick-up finger must be used, so that the net result is that the reduction in forces between the balls and the pick-up finger is offset by the reduced structural integrity of the ball pick-up finger because of its increased length. Consequently, satisfactory higher speed operation is not achieved by making such a change in the design of the pick-up finger.

Prior art recirculating ball screws generally do not have any special provisions for lubrication. In many of these ball screws, the ball pick-up finger is an extension of the ball recirculating conduit and, therefore, the material for the recirculating conduit is selected based on the structural requirements for the ball pick-up finger. Also, generally the recirculating conduit or conduits consist of one or more recirculating members which attach to the nut and recirculate the balls through a conduit outside the nut. These recirculating members do not readily lend themselves to lubrication, other than by the placing of lubricant on the lead screw over which the nut travels. In some applications, the lead screw is readily lubricated and, therefore, the absence of a supply of lubricant and a method for dispersing it within the nut is not a limiting factor, but in other applications, such as in flap actuators for modern aircraft as previously described, such a supply of lubricant is not readily achieved. Therefore, life and reliability of the recirculating ball screw in such an application depends at least in part for the ball screw to retain its own lubricant supply.

In other applications, both high speed and high temperature operation is necessary. By way of example, modern jet engines have thrust reversing mechanisms attached thereto; such mechanisms having doors or cascades which, when actuated, redirect the exhaust of the engine to reverse the direction of thrust of the engine. These doors must be moved between their normal and their thrust reversing positions, very quickly, for effective aircraft declarations. Thus, a recirculating ball screw for such applications must be reliably capable of high speed operation. In addition, the environment in the region of a jet engine exhaust is necessarily of elevated temperature; temperatures as high as 600°F in the compartments for such equipment not being unusual. Prior art recirculating ball screws, because of their inherent limitations as previously discussed, are not suitable for such applications.

BRIEF SUMMARY OF THE INVENTION

The present invention is a recirculating ball screw suitable for high speed and high temperature operation and having an improved lubrication system for insuring life and reliability under such conditions. Satisfactory high speed operation is achieved by a new ball recirculating member which directs the balls from the helical ball track without the use of a ball pick-up finger. The ball recirculating member, in combination with the lead screw ball groove, urges the balls radially outward from the lead screw in a direction initially substantially tangent to the helical ball path, and after transmitting the balls axially along the lead screw, redeposits the balls in the helical ball track in a direction again substantially tangent to that path. In this manner, sharp bends in the direction of the ball path are eliminated and, therefore, the high impingement loads on the balls and ball recirculating member characteristic of the prior art recirculating ball screws are eliminated.

The improved lubrication system for the present invention recirculating ball screw is achieved through the use of selected materials and lubricants for the ball recirculating member and by an outer sleeve or sealing member which envelops the ball recirculating member and, in combination with appropriately located sealing rings prevents loss of the lubricant and ingress of contaminants.

BRIEF DESCRIPTION OF THE DRAWINGS

FIG. 1 is a perspective view of a prior art recirculating ball screw.

FIG. 2 is a cross-section of the recirculating ball screw of FIG. 1 taken along lines 2—2 of that figure.

FIG. 3 is a cross-section of the recirculating ball screw of FIG. 1 taken along lines 3—3 of that figure.

FIG. 4 is a perspective view of the present invention recirculating ball screw partially cut away to show the ball recirculating members.

FIG. 5 is a cross-section of the recirculating ball screw of FIG. 4 taken along lines 5—5 of that figure.

FIG. 6 is a cross-sectional view of the recirculating ball screw of FIG. 4 taken along lines 6—6 of that figure.

FIG. 7 is a view of the ball recirculating member showing the axial ball path within the recirculating member.

FIG. 8 is an exploded view of a cross-section of the lead screw and ball recirculating member showing the forces on the balls caused by the ball recirculating member which urge the ball out of the lead screw groove for recycling by the recirculating member.

FIG. 9 is a perspective view, partially cut away, of an alternate embodiment of the present invention having a single ball recirculation member with a plurality of ball recirculation paths.

DETAILED DESCRIPTION OF THE INVENTION

Referring first to FIGS. 1, 2 and 3, a perspective view of a prior art recirculating ball screw may be seen. The major elements of this recirculating ball screw are the same as the major elements in the present invention ball screw, though design changes, particularly in the recirculating member, have been made to achieve the results of the present invention device. The recirculating ball screw is comprised of a lead screw 10, a nut 12, recirculating members 14, and a compliment of balls 16 which are located between ball grooves in lead screw 10 and nut 12 and are continually recirculated by recirculating members 14 so as to never pass out from under nut 12.

The ball groove in the lead screw 10 and in nut 12 are very much like the raceways of the well known annular contact ball bearing, but are helical, rather than annular as in the ball bearing. The ball grooves in lead screw 10 and in nut 12 have the same lead and are so disposed so as to define a helical ball groove or path between lead screw 10 and nut 12. A full compliment of balls 16 is placed in this helical ball groove and also within ball recirculating members 14 so that as the lead screw 10 is rotated with respect to nut 12, the lead screw advances with respect to the nut by rolling on the balls between the lead screw and the nut. As the balls approach the end of their helical path, they are removed from this helical path by the ball return members 14, transferred axially through the ball return members, and deposited at a point in their helical path forward of where they were picked up. Rotation of the lead screw 10 in the opposite direction reverses the direction of the balls within their helical ball path and also reverses the direction of balls within the ball return members 14, so as to always confine the balls within the ball return members 14 or within the helical ball groove in lead screw 10 and nut 12 between the ends of ball return members 14.

Also shown in FIG. 1 are a threaded area and a shoulder 22 on nut 12, which may be used for mounting. Normally, one member of the ball screw, such as nut 12, is mounted so as to be restrained in rotation and the other member, in most cases the lead screw 10, is mounted on bearings 20 and is driven by a reversible rotating motor so that operation of the motor in a chosen direction causes the nut to advance along the lead screw.

Now referring to FIGS. 2 and 3, further details of the prior art ball recirculating members 14 may be seen. This explanation of a typical prior art recirculating member is presented here so as to make more apparent the novel features of the present invention recirculating ball screw, and in particular, the ball recirculating methods used therein. In FIG. 2, recirculating member 14 contains ball pick-up finger 24, which extends into the helical ball groove between nut 12 and lead screw 10 so as to interrupt the helical ball path of the balls and to redirect the balls into ball recirculating member 14. It may be seen that the helical ball path, generally indicated by dashed line 26, is interrupted at point 28 and abruptly changed to ball path 30 through ball recirculating member 14. The abrupt change in ball path direction at point 28 is caused by the impingement of the balls on the ball pick-up finger 24, and because of this abrupt change in ball direction, the ball pick-up finger 24 is subjected to high impact loads even at moderate angular velocities of lead screw 10.

FIG. 3 shows the other end of ball recirculating member 14 and the manner in which the balls are redeposited to the helical groove between lead screws 10 and nut 12. It may be seen that the balls undergo a similar abrupt change in direction of motion at point 32, which results in high loads on the balls and lead screw 10 at that point. Also shown is a ball pick-up finger 34 substantially identical to the ball pick-up finger 24 in FIG. 2, which serves as a guiding finger in redepositing the balls, as shown in FIG. 3, and which further acts as a ball pick-up finger when the lead screw is rotated in the opposite direction. Consequently, rotation of the lead screw at a high angular velocity in the direction indicated by the arrows in FIGS. 2 and 3 will cause a deterioration and failure of ball pick-up finger 24, whereas a rotation of lead screw 10 at a high angular velocity in the opposite direction will cause a similar deterioration and failure in ball pick-up finger 34.

It should be further noted that in the prior art lead screw of FIGS. 1, 2 and 3, there has been no effective method for retaining and uniformly dispensing lubricant.

Now, referring to FIG. 4, a partially cut away perspective view of the present invention recirculating ball screw may be seen. The principal elements of this recirculating ball screw are substantially the same as the principal elements of the recirculating ball screw shown in FIG. 1. By way of example, lead screw 40 is very similar to lead screw 10 shown in FIG. 1, having only minor differences, the details of which will be subsequently described. Consequently, FIG. 4 shows only those elements and details of the present invention ball screw which are inventive in nature, and does not show those parts of the ball screw which are well known in the prior art, such as the ends of lead screw 40 which are adapted to mount the lead screw in a particular installation.

The lead screw 40 is a generally cylindrical member defining a continuous helical ball groove. The nut 42 which is disposed about the screw 40 is generally a cylindrically shaped member having an annular cross-section and defining an internal continuous helical ball groove. The ball grooves of the screw 40 and nut 42 are adaptable to coooperatively engage balls between them. A plurality of recirculating members 44 are disposed axially along the nut 42. Each recirculating member 44 comprises a rectangular section which has a surface facing the interior of the nut 42. A tunnel is disposed within each member 44 defining a pair of openings terminating in the interior of the nut 42. Each tunnel defines a path or trajectory such as that shown in FIG. 7, one opening of which urges a ball out of a groove into the tunnel. The tunnel carries the ball over a land and deposits the ball from the other opening into an adjacent groove. Thus, by the use of a plurality of recirculating members 44 the balls between the screw 42 and nut 40 are continuously recirculated. The action by which the ball is urged from one groove and over the land is discussed in detail herein. The screw 40, nut 42 and recirculating members 44 may be metal parts made utilizing known machining techniques.

In the preferred embodiment, as shown in FIG. 4, three ball recirculating members 44 are disposed 120° apart around nut 42, and are spaced axially along the nut so that each of ball recirculating members 44 operates with respect to an independent turn of the helical ball groove in nut 42 and lead screw 40. It is to be understood, however, that the principles of the present invention may be readily adapted to other ball recirculating members, such as a ball recirculating member which transfers the balls in an axial direction by more than one turn of the helical ball groove.

Now referring to FIG. 5, a cross-section of the present invention recirculating ball screw taken along lines 5—5 of FIG. 4 may be seen. The helical ball groove between nut 42 and shaft 40 defines a diameter 52 for the normal helical path of the centers of the balls. Also shown in the figure is the trajectory of the ball centers as the balls travel through the ball recirculating member 44, generally indicated by the dashed line 54 in that figure. Of particular importance to the present invention is the fact that the trajectory 54 for the balls as they pass through the recirculating member 44 is substantially tangent to the circle defined by diameter 52 at points 58 and 60, and that it smoothly extends radially outward to point 62 where the ball is at a sufficient radial distance to clear the land between the grooves in lead screw 40 (which define the lead screw outer diameter 56) so that the ball may be guided in a generally axial direction over the land for redepositing in the helical groove on the opposite side of the land. Also, of importance to the present invention, for reasons which will become subsequently apparent, is the fact that the outer diameter 56 of screw 40 is less than the diameter 52 (defining the path of the centers of the balls 46 in the helical ball groove).

Now referring to FIG. 6, a cross-section along lines 6—6 of FIG. 4 may be seen. This cross-section shows in greater detail the geometry of lead screw 40 and nut 42, and the disposition of balls within the helical ball groove between lead screw 40 and nut 42, and in ball recirculation member 44.

For purposes of illustrating the manner in which the balls contact and are free to rotate on the lead screw 40 and nut 42, it has been assumed in FIG. 6 that the lead screw 40 is subjected to a rotating force urging it towards the left of that figure, and in opposition to this force a restraining force has been applied to the nut 42. These forces are generally indicated by the arrows in that figure.

When the recirculating ball screw is subject to the loads as shown, the lead screw 40 moves to the left with respect to nut 42, to the extent that it is free to do so. This contact is best illustrated by the four balls which are shown contacting the cross-section of nut 42, and which have indicated through them diametral lines through the point of contact of the balls 46 with the lead screw 40 and nut 42. The diametral lines through the points of contact of the balls indicate the direction of the forces exerted by the balls on lead screw 40 and nut 42. The arrowhead on these lines indicates the direction of the force exerted by the balls 46 on the lead screw. It is to be noted that these forces have both a radial and an axial component. When the direction of the load on lead screw 40 and nut 42 is reversed, the screw 40 will move to the right with respect to nut 42, to the extent that it is free to do so, and the contact points between the balls 46 and lead screw 40 and nut 42 will now fall on the dashed diametral line indicated in FIG. 6.

In the presently preferred embodiment groove edge loadings are minimized through controlled geometry of the helical path cross-section allowing the use of a smaller than normal overland diameter. The controlling factors are contact angle, individual ball load and location of the major diameter of the ball contact ellipse with respect to groove cornor radius of the screw member. The net effect of these factors is a relatively shallow ball groove in the lead screw, which smoothly blends into the outer diameter of the lead screw.

Now referring to FIG. 7, a view of the ball recirculating member 44, looking into the ball groove of that member, may be seen. Also indicated in that figure is a projection 70 of the helix described by the center of balls 46 as they travel in the helical ball groove between nut 42 and lead screw 40. The projection of this helix is indicated in that figure as the continuation of the path of travel of the center of the balls 46 as they pass through the ball recirculating member 44, generally indicated by the line 72 in that figure. It is to be noted that path 72 at points 74 is substantially tangent to, and a continuation of, helical path 70, and that between points 74, path 72 curves so as to transfer the balls in an axial direction over a land of lead screw 40. A ball located at point 62 is located directly over a land between grooves in lead screw 40, as indicated in FIGS. 5 and 6. The curve in ball path 72 should be free of abrupt turns so as to avoid high acceleration forces on the balls as they move through the ball recirculation member 44, but otherwise may have any convenient geometry.

In the presently preferred embodiment, a specific curve has been found to be especially useful for the shape of the ball path projection 72. This shape consists of segments of a cycloid between points 74 and 62. The use of the cycloidal segments yields the following results. Since there is substantially a full complement of balls in the helical ball groove between lead screw 40 and nut 42 and in the ball recirculation member 44, the linear velocity of the balls along their path of travel is constant (for a constant angular velocity). Therefore, there is no linear acceleration of the balls along their path. However, there is a significant acceleration of the balls in a radial direction. Such acceleration allows the balls to move first radially outward so as to clear the land in lead screw 40 and then to move radially inward so as to be redeposited in an adjacent lead screw groove as was shown in FIG. 5.

In addition to the radial acceleration on the balls, another major component of acceleration is acceleration of the balls to achieve the axial motion of the balls within the ball recirculating member 44. This acceleration is substantially perpendicular to the tangent of the arc of the path of travel 72 through the path of travel 72 through the ball recirculation member 44, as shown in FIG. 7. By having the ball follow a substantially cycloidal path this component of ball acceleration is substantially constant as the ball travels through the recirculation member 44.

In summary, it is to be noted that the path followed by a ball in rolling along the helical ball groove between lead screw 40 and nut 42, and in passing through the ball recirculating member 44, is a trajectory which, unlike that of the prior art recirculating ball screw shown in FIGS. 1, 2 and 3, is free of sudden changes in direction, and instead is a smooth and continuous trajectory over which the balls may roll, (e.g., the ball trajectory defines a fair curve) without being subject to damaging accelerations as may occur in prior art recirculating ball screws as the balls strike the ball pick-up finger 24. Also, it is to be understood that substantially any relatively smooth curve may be used for the axial ball trajectory 72 in FIG. 7 or for the radial ball trajectory 54 in FIG. 5 (e.g., so as to define a fair curve) without departing from the scope and spirit of the present invention. In addition, it is to be understood that it is not necessary for the various parts of the ball trajectories to be perfectly tangent to the adjoining ball trajectory, that is, trajectory 72 in FIG. 7 need not be perfectly tangent to trajectory 70 at point 74. Though any lack of tangency at such points will increase the loads on the balls and the surrounding structure at that point, the lack of tangency will normally be considerably less than that experienced by the prior art recirculating ball screw at point 28 (FIG. 2), and in addition, the recirculating member 44 is much more able to withstand high ball loads than is the prior art recirculating ball screw, because of the absence of a structurally weak ball pick-up finger. Furthermore, though the present invention recirculating ball screw is capable of operation at speeds unobtainable with the prior art recirculating ball screw, the advantages of the improved lubrication system and the ball recirculation without the use of a ball pick-up finger makes the present invention useful and desirable in low speed applications also.

Now referring to FIG. 8, the manner in which the balls are encouraged (e.g., assured) to leave the ball groove in lead screw 40 may be seen. This figure shows a portion of lead screw 40 and ball recirculation member 44 and the forces on a ball as the ball proceeds into the ball recirculation member 44. Also shown in phantom in this figure is the outline of a ball groove in nut 42, and the normal contact of the ball with that ball groove, as was pictured in and described with respect to FIG. 6. It may be seen that normally the ball contacts the ball groove in lead screw 40 at point 80, and on a point 82, diametrically opposite point 80, the ball normally contacts the helical groove in nut 42. However, as the center of the ball moves along trajectory 70 in FIG. 7 and passes point 74 so as to be within the curved portion of the ball trajectory within the ball recirculation member 44, the contact point between the ball and the recirculation member 44 moves from point 82 to a contact point, which is closer to the lead screw, such as point 84 (FIG. 8). This movement of the contact point is due to the geometry selected for the ball groove in the ball recirculation member 44 and the curvature of trajectory 72 between points 74 and 76. As the contact point between the balls and the nut 42 moves down from point 82, there is a resultant force on the ball tending to encourage the ball to move upward into ball recirculation member 44 and over the land between ball grooves on lead screw 40. By way of example, when the contact between the ball and ball recirculation member 44 has moved down to point 84, it may be seen that the force on the ball from the nut 42 ($F_n$) is no longer colinear with the force on the ball from the lead screw 40 ($F_{ls}$) and that the resultant of these two forces ($F_R$) is a force tending to urge the ball into the ball recirculation member 44 and over the land between ball grooves in lead screw 40. As the ball trajectory in the ball recirculation member 44 curves away from what would be a continuation of the helical trajectory 70 (FIG. 7) the pressure on the ball at points 80 and 84 in FIG. 8 will further force the ball to move out of the ball groove in lead screw 40 as hereinbefore described.

During the ball transfer through ball recirculation member 44 to an adjacent groove the forces acting on a ball as a free body are a function of the helix angle and the recirculating member geometry. At point 74 the geometry of the ball groove in the ball recirculation member 44 is substantially a continuation of the helical ball groove in nut 42. However, since the ball recirculation member 44 is in general not intended to aid in supporting the axial load applied to the recirculating ball screw, the ball path in recirculating ball member 44 at point 74 is somewhat larger than the equivalent ball path in nut 42 so that the balls, which undergo a slight elastic deformation and which elastically deform a contact area on nut 42 and lead screw 40 when loaded therebetween, may enter the ball recirculation member 44 without subjecting that member to similar loads and deformation. In addition, it is desirable to radius or otherwise slightly relieve the ball groove in nut 42 in the vicinity of ball recirculating member 44, so that the loads on the balls due to an axial load on the recirculating ball screw are gradually relieved as the ball approaches the ball recirculating member 44, and passage of a loaded ball over a sharp corner is avoided.

Now referring to FIG. 9, an alternate embodiment of the present invention recirculating ball screw, partially cut away, may be seen. In this embodiment, a single ball recirculation member 90 is disposed in functional relationship to the nut 92 in the same manner as each of the ball recirculation members 44 shown in FIG. 4. This single ball recirculation member 90 contains a plurality of ball recirculating paths therein, each of which is substantially the same as the ball recirculating path in the ball recirculation members 44. With this plurality of ball recirculating paths, adjacent portions of the helical ball groove between nut 92 and lead screw 94 may contain a full complement of balls, since one ball recirculation path urges the balls out of the helical groove before the adjacent recirculating path deposits additional balls into that same groove.

In all the embodiments of the present invention heretofore described, the ball recirculation member urges the balls out of the helical ball path and over a single land in the lead screw to deposit the balls in the immediately adjacent ball groove. This limited axial transportation of the balls is easily accomplished through the use of a ball recirculation member having the geometry and characteristics as hereinbefore described. However, it is possible using the principle of the present invention to axially transport the balls by more than one ball groove if such a variation in the present invention were desired. To achieve this, the ball recirculation member would be so adapted as to urge the ball out of the groove in the lead screw and then to gradually envelope the balls in a conduit to transport the balls radially outward and axially over the helical ball groove in the nut, and to subsequently deposit the balls at any desired new axial location.

Having now described the manner in which ball recirculation is achieved in the present invention recirculating ball screw, a description of the improved lubrication system may now be given. Referring for this purpose to FIG. 4, it may be seen that ball recirculation members 44 fit within a mating opening of nut 42 and that an outer sleeve 48 slides axially over ball recirculation members 44 and nut 42 so as to retain the ball recirculation members 44 in position and to provide a cover for the assembly. The volume between the outer surface of nuts 42 and recirculating member 44 and the interior surfaces of sleeve 48 is used as a lubricant reservoir. The ends of the reservoir are sealed with seal rings 50 which are located in mating grooves in nut 42 and in cooperation with outer sleeve 48 provide an outer surface seal over nut 42 and ball recirculation members.

The absence of a finger as part of the ball recirculation member and the controlled acceleration of a ball when in the ball recirculation member (and consequently the forces between a ball and the recirculation member) allow a wider choice of materials and lubricants for the recirculating ball screw. One type of material which has been found particularly useful for recirculating member 44 are porous metals. These materials have good structural integrity and dimensional stability, and provide a means for uniformly transporting by capulary action lubricant from the reservoir to the balls. In the presently preferred embodiment the lubricant is fluorsilicon fluid.

Having now described the preferred embodiment of the present invention recirculating ball screw and its improved lubrication system, many variations thereof will become apparent to one skilled in the art without departing from the scope and spirit of the present invention. By way of example, the preferred embodiment of the present invention is an embodiment directed particularly to high speed and high temperature applications. However, recirculating ball screws are commonly used in many applications which may involve extremes in temperature, speed, load, moisture, contamination, etc., and variations of the heretofore described preferred embodiment will become immediately obvious to one skilled in the art of recirculating ball screws and ball bearings. By way of more specific example, in applications involving low speeds and moderate temperatures, ball path curvatures within the recirculating ball screw are less critical and other lubricants may be found to be better adapted to such environment. In applications wherein the recirculating ball screw may be immersed in an adequate lubricant, or an adequate supply of lubricant furnished by some other means, the ball recirculation member 44 might be fabricated from a substantially non-porous material. These specific variations in application are mentioned here for the sole purpose of illustrating a few of the possible variations which become apparent as a result of a change in application of the present invention recirculating ball screw, and are not intended to limit or restrict the present invention in any way.

I claim:

1. A recirculating ball screw including a lead screw and nut defining a helical ball path, comprising:
   a plurality of balls;
   a ball recirculating member, coupled to said nut, said member defining at least one tunnel having a pair of openings terminating in the interior of said nut such that one of said openings is axially disposed from the other by a span of at least one land, said tunnel defining a path over at least one land of said screw, said openings being shaped so as to apply pressure on said balls, urging said balls out of the ball groove into said tunnel;

a housing disposed about said nut defining an enclosed reservoir for the storage of a lubricant;

transport means for transporting said lubricant from said reservoir into contact with said balls, whereby lubrication is provided to said recirculating ball screw.

2. The ball screw defined in claim 1 wherein said transport means includes a porous material incorporated into said recirculating member such that lubricant from said reservoir is transported through said porous material and into contact with said balls as they pass through said tunnel.

3. The ball screw defined in claim 2 wherein said housing comprises a sleeve disposed about said nut and includes O-rings for sealing said sleeve and said nut to define said reservoir.

4. The ball screw defined in claim 2 wherein said recirculating member defines a plurality of separate tunnels.

5. The ball screw defined in claim 2 wherein the projection of the ball recirculation path, defined by said tunnel in said recirculation member, on a surface showing the axial and the circumferential components, is a curve which:
   a. at its ends is substantially tangent to the equivalent projection of the helical ball path at that point defined by said nut and said screw;
   b. curves away from its ends towards its center substantially describing segments of a cycloid;
   c. said cycloid segments being interconnected at their closest points by a straight line substantially tangent to said cycloid segments at said closest points.

6. The ball screw defined in claim 1 wherein said recirculating member comprises a sintered metal.

7. A recirculating ball screw including a lead screw and nut defining a helical ball path comprising:

a plurality of balls;

a ball recirculating member, coupled to said nut, said member defining at least one ball recirculating path having a pair of openings terminating in the interior of said nut such that one of said openings is axially disposed from the other by a space of at least one land, and defining a path over said land, said openings being shaped so as to apply pressure on said balls urging said balls out of the ball grooves into said recirculating path and wherein the projections of the said ball recirculation path in said recirculating member on a surface, showing the axial and the circumferential components, is a curve which
   a. at its ends is substantially tangent to the equivalent projection of the helical ball path at that point defined by said nut and said lead screw;
   b. curves away from its ends toward its center substantially describing segments of a cycloid;
   c. said cycloid segments being interconnected at their closest points by a straight line substantially tangent to said cycloid segments at said closest points.

* * * * *